US009681771B2

(12) United States Patent
Herling et al.

(10) Patent No.: US 9,681,771 B2
(45) Date of Patent: Jun. 20, 2017

(54) CONTAINER FOR LIQUIDS

(75) Inventors: Nicholas Herling, Toronto (CA); Marc Heinke, Oakville (CA)

(73) Assignee: Precidio Design Inc., Oakville, CA (US)

( * ) Notice: Subject to any disclaimer, the term of this patent is extended or adjusted under 35 U.S.C. 154(b) by 512 days.

(21) Appl. No.: 13/416,461

(22) Filed: Mar. 9, 2012

(65) Prior Publication Data
US 2013/0233178 A1    Sep. 12, 2013

(51) Int. Cl.
A47J 31/06    (2006.01)
A47J 31/18    (2006.01)
A47J 41/00    (2006.01)

(52) U.S. Cl.
CPC .......... *A47J 31/18* (2013.01); *A47J 41/0077* (2013.01)

(58) Field of Classification Search
CPC ........ A47J 41/0077; A47J 31/18; A47J 31/02; A47J 31/0626; A47J 31/0636; A47J 31/20
USPC ......... 99/322, 323, 279, 317, 316, 318, 284, 99/391; 220/521, 592.2, 592.27; 210/474
See application file for complete search history.

(56) References Cited

U.S. PATENT DOCUMENTS

| | | | |
|---|---|---|---|
| 1,098,850 A | | 6/1914 | Steel |
| 1,147,632 A | * | 7/1915 | Lamb ........................ 215/13.1 |
| 1,315,627 A | * | 9/1919 | Fahnestock ........................ 74/23 |
| 2,127,785 A | | 8/1938 | Schimpf |
| 2,808,167 A | * | 10/1957 | Polazzolo ........................ 215/13.1 |
| 2,856,842 A | | 10/1958 | Schwaneke |
| 3,181,951 A | | 5/1965 | Gronvold |
| 3,581,927 A | * | 6/1971 | Langdon ........................ 215/228 |
| 4,215,785 A | * | 8/1980 | Schwaiger ........................ 215/11.6 |
| 4,616,758 A | * | 10/1986 | Zimmermann ........................ 215/13.1 |
| 5,046,409 A | | 9/1991 | Henn |
| 5,197,602 A | * | 3/1993 | Biesecker ........................ 206/514 |
| 5,329,778 A | | 7/1994 | Padamsee |
| 5,775,205 A | | 7/1998 | Melton |
| 5,851,612 A | | 12/1998 | Umeda et al. |
| 6,050,443 A | | 4/2000 | Tung |
| 6,202,542 B1 | | 3/2001 | Melton |
| 6,284,866 B1 | | 9/2001 | Schiavone |
| 6,786,137 B1 | | 9/2004 | Shen |
| D505,831 S | | 6/2005 | Liu |
| 7,026,027 B2 | | 4/2006 | Turner et al. |

(Continued)

OTHER PUBLICATIONS

Alexander, Reginald, "USPTO Communication" mailed Feb. 1, 2016 in related U.S. Appl. No. 14/193,807.

(Continued)

*Primary Examiner* — Quang D Thanh
*Assistant Examiner* — Joseph Iskra

(57) ABSTRACT

A container is disclosed that comprises an outer vessel having an inner cavity, and an inner vessel having an inner cavity. The inner vessel and outer vessel are configured for receiving all or substantially all of the inner vessel through an opening in the outer vessel such that in operation, said opening of the inner vessel may be releasably positioned proximate the opening of the outer vessel. The container also includes a lid for releasably enclosing said inner vessel within said outer vessel. The outer container may be made from a material called TRITAN and the inner vessel may be made from glass. A seal may be provided between the top to the inner vessel and the lid.

30 Claims, 13 Drawing Sheets

(56) References Cited

U.S. PATENT DOCUMENTS

| | | | |
|---|---|---|---|
| 7,047,983 B2 * | 5/2006 | Manougian et al. | 132/294 |
| 7,270,244 B1 * | 9/2007 | Liu | 215/13.1 |
| D560,097 S | 1/2008 | Shen | |
| 7,318,374 B2 | 1/2008 | Guerrero | |
| D565,353 S | 4/2008 | Roth et al. | |
| 7,441,665 B2 | 10/2008 | Bridges et al. | |
| D627,604 S | 11/2010 | Eyal | |
| 7,895,939 B2 * | 3/2011 | Pan | 99/322 |
| 7,954,661 B2 * | 6/2011 | Uchida et al. | 220/592.26 |
| D652,682 S | 1/2012 | Eyal | |
| 8,225,957 B1 * | 7/2012 | Volan | 220/592.23 |
| D669,736 S | 10/2012 | Bodum | |
| 8,307,755 B2 | 11/2012 | Shen | |
| 8,387,517 B2 | 3/2013 | Geissler | |
| D690,161 S | 9/2013 | Garner | |
| 8,567,620 B2 * | 10/2013 | Ettlin et al. | 215/40 |
| 8,596,480 B2 * | 12/2013 | Arjomand | 220/4.01 |
| RE45,055 E | 8/2014 | Roth et al. | |
| 2005/0056610 A1 * | 3/2005 | Randolph | 215/11.1 |
| 2008/0251486 A1 * | 10/2008 | Housley | 215/11.5 |
| 2009/0178573 A1 * | 7/2009 | Pan | 99/323 |
| 2009/0294459 A1 * | 12/2009 | Hovsepian | B65D 43/0212 220/711 |
| 2010/0108693 A1 * | 5/2010 | Zhang | 220/592.2 |
| 2010/0263549 A1 | 10/2010 | Lee | |
| 2011/0056386 A1 * | 3/2011 | Taketani | 99/317 |
| 2011/0226802 A1 * | 9/2011 | Moore | 222/1 |
| 2012/0006830 A1 * | 1/2012 | Larreau | 220/592.17 |

OTHER PUBLICATIONS

Alexander, Reginald, "USPTO Communication" mailed Aug. 3, 2016 in related U.S. Appl. No. 14/193,807.

\* cited by examiner

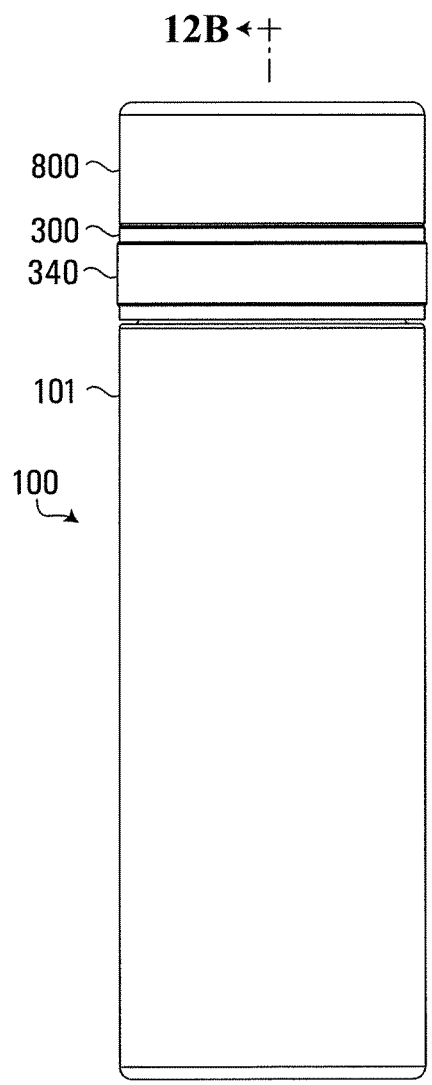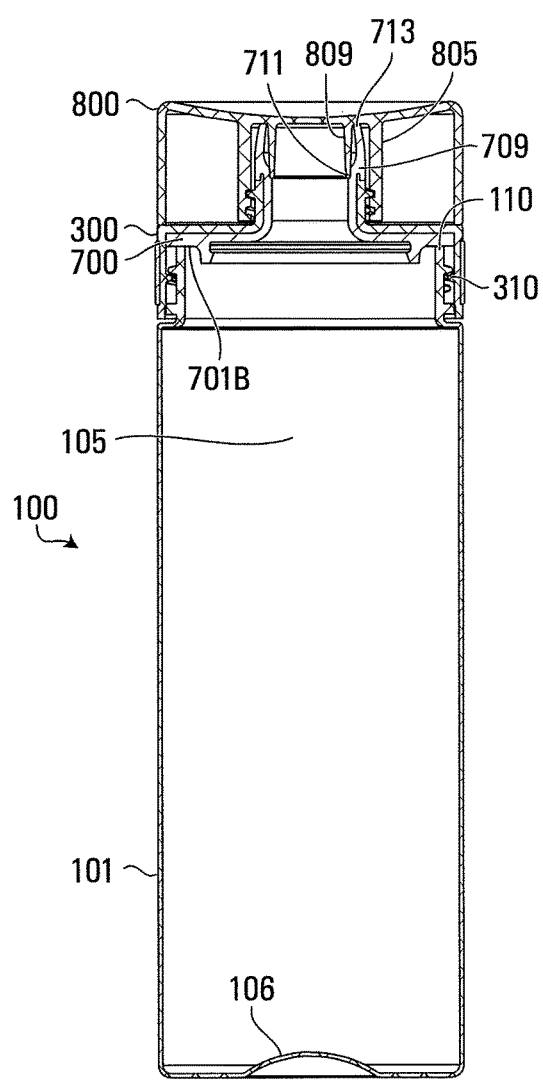
FIG. 12A
FIG. 12B

CONTAINER FOR LIQUIDS

FIELD OF THE INVENTION

This invention relates to containers for liquids, including containers that can be used for multiple purposes. Such containers include beverage containers that can be assembled in more than one configuration to be used for different purposes. For example a container is disclosed that can be used as a simple beverage bottle; as a beverage bottle that can be used to hold a hot/cold beverage; and as a bottle that can be specially configured to serve as a tea flask.

BACKGROUND

Containers that are used to hold various types of liquids are well known. Some such containers are specifically intended to be used to hold a beverage of some kind. A person can access the beverage in the container when they wish to consume the beverage. Some such beverage containers are specifically adapted to be used by persons who wish to hold a cold beverage or a beverage that is at the same temperature as the environment in them. Such containers may be used by an athlete or other person engaged in an exercise activity. Such a beverage bottle may be used by a person during or after physical activity by the person. Often such containers are made of materials such as metals or hard plastics that can resist breakage when subjected to at least a moderate impact force.

Other containers are adapted for specific use to hold hot or cold liquids such as containers for use in holding hot beverages. One of the desirable features of the material used that is in contact with the liquid is that the container material will remain inert at elevated temperatures. Glass has been used as an inert material in constructing hot beverage containers. The holding of beverages in glass containers is considered desirable by many consumers of beverages. However, glass is brittle and particularly prone to breakage when subject to impact forces.

It is known to construct a relatively breakage-resistant container that is specifically adapted to hold a hot beverage. By way of example, in some such composite containers, a glass inner vessel is encased within a hard outer shell. The hard outer shell provides some level of protection for the glass inner vessel. Such containers can readily hold both hot and cold beverages within the inner glass vessel. Due to their construction, such containers are relatively good in reducing pace of the loss of temperature of hot drinks and the pace of the increase in temperature of cold drinks, towards the temperature of the environment. However, they may still to some degree be prone to breakage, particularly when used in an environment where a person is engaged in physical activity where the risk to an impact force is increased compared to normal use.

Also, when constructing containers for holding liquids, there are other design considerations that may have to be taken into account. For example, providing a re-sealable container that can be used multiple times raises challenges. Also, providing containers that employ materials that are considered to be safe from a human/animal health perspective may also be important, particularly for beverage containers.

Improvements in known liquid containers are desired.

SUMMARY OF THE INVENTION

According to one aspect of the present invention there is provided a container comprising: an outer vessel having an inner cavity, the inner cavity of the outer vessel having an opening; an inner vessel having an inner cavity, the inner cavity of the inner vessel having an opening; the inner vessel and the outer vessel being configured for receiving all or substantially all of the inner vessel through the opening of the outer vessel into the inner cavity of the outer vessel such that in operation, the opening of the inner vessel may be releasably positioned proximate the opening of the outer vessel; a lid for releasably enclosing the inner vessel within the outer vessel.

According to another aspect of the present invention there is provided a container comprising: an outer vessel having a bottom wall for supporting the outer vessel, an inner cavity defined at least in part by an inner surface of the bottom wall and an inner surface of a side wall, the inner cavity of the outer vessel having a top opening; an inner vessel having an inner cavity defined at least in part by an inner surface of a side wall, the inner cavity of the inner vessel having a top opening; the inner vessel and the outer vessel being configured for receiving all or substantially all of the inner vessel through the top opening of the outer vessel into the inner cavity of the outer vessel such that in operation, the top opening of the inner vessel may be releasably positioned proximate the top opening of the outer vessel; a lid for releasably enclosing the inner vessel within the outer vessel.

According to another aspect of the present invention there is provided a container comprising: an outer vessel having an inner cavity, the inner cavity of the outer vessel having an opening; an inner vessel having an inner cavity, the inner cavity of the inner vessel having an opening; the inner vessel and the outer vessel being configured for receiving all or substantially all of the inner vessel through the opening of the outer vessel into the inner cavity of the outer vessel such that in operation, the top opening of the inner vessel may be releasably positioned proximate the top opening of the outer vessel; a lid for releasably enclosing the inner vessel within the outer vessel, the lid having an inner cavity, and for enclosing the inner cavity of the outer vessel when the inner vessel is not located within the outer vessel; a sealing device disposed within the inner cavity of the lid, the sealing device being configured for providing (a) a seal between the opening to the inner cavity of the inner vessel and the lid when the inner vessel is located within the inner cavity of the outer vessel and (b) a seal between the opening to the inner cavity of the outer vessel and the lid when the inner vessel is not located within the inner cavity of the outer vessel.

According to another aspect of the present invention there is provided a method of using a container, the container comprising: an outer vessel having an inner cavity, the inner cavity of the outer vessel having an opening; an inner vessel having an inner cavity, the inner cavity of the inner vessel having an opening; the inner vessel and the outer vessel being configured for receiving all or substantially all of the inner vessel through the opening of the outer vessel into the inner cavity of the outer vessel such that in operation, the top opening of the inner vessel may be releasably positioned proximate the top opening of the outer vessel; a lid for releasably enclosing the inner vessel within the outer vessel; wherein the method comprises: (i) filling the inner vessel with a hot or cold beverage; (ii) inserting the inner vessel into the outer vessel through the opening into the inner cavity; (iii) securing the lid to hold the inner vessel within the inner cavity of the outer vessel.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention:

FIG. 12A is a front elevation view of the container of FIG. 1A configured in a third mode of operation;
FIG. 12B is a elevation cross sectional view at section 12B-12B in FIG. 12A.

DETAILED DESCRIPTION

Figure 1A:
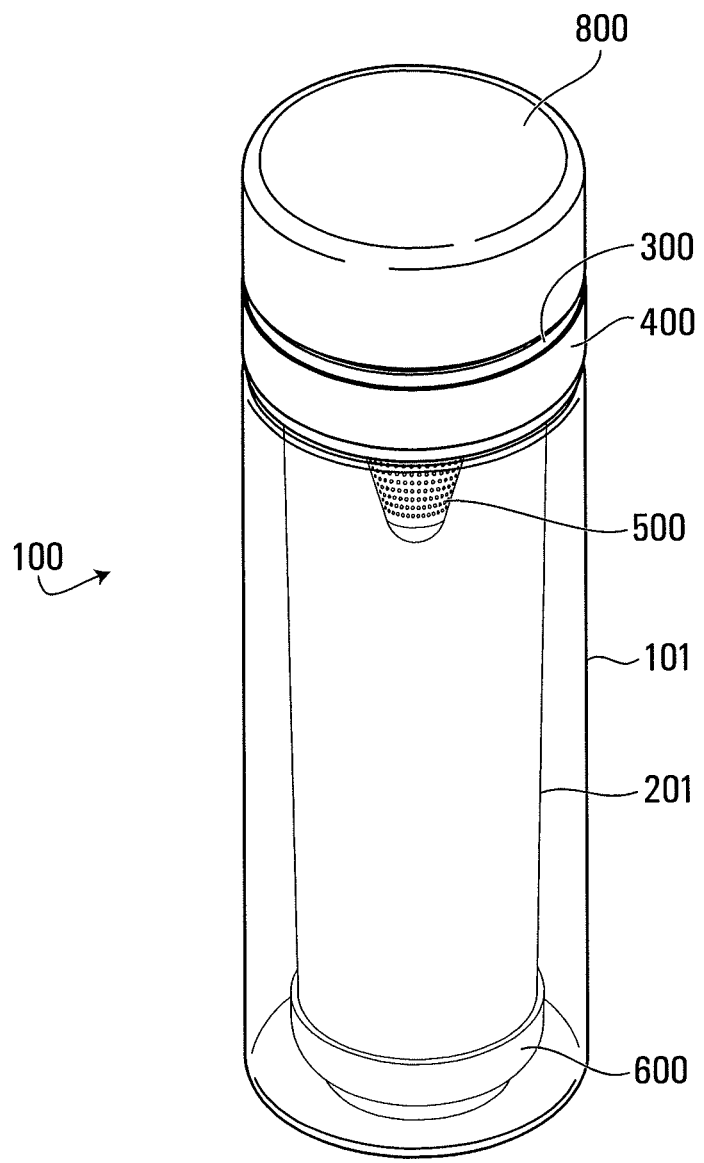
FIG. 1A is a perspective view of an assembled container.
Figure 1B:
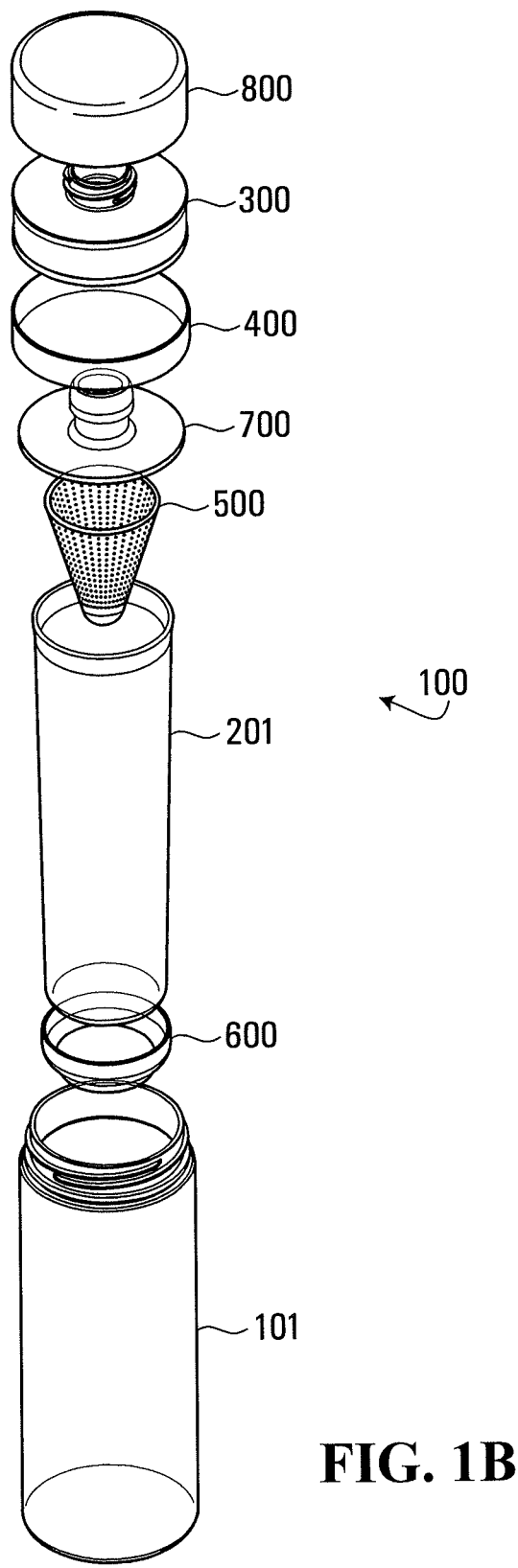
FIG. 1B is an exploded perspective view of the container of FIG. 1A.

With reference first to FIG. 1A, a container 100 is shown in an assembled configuration. In FIG. 1B the components that may comprise container 100 are shown in a disassembled configuration with the components exploded apart. Container 100 may comprise an outer vessel 101, an inner vessel 201, a lid 300, a lid grip band 400, a tea strainer 500, a base pad 600, a seal spout 700 and a cap 800.

As disclosed, container 100 has several significant features including: (a) an outer container that may provide some level of protection from impact forces to the inner container; (b) the possibility to select materials for the inner and outer vessels based on different or at least not completely overlapping design parameters. For example, while the materials for both inner and outer vessels may be chosen so that they are safe for storing and use of liquids for human and/or animal consumption, the outer vessel 101 may be selected so that it is a more impact resistant material than the inner vessel 201.

Inner vessel 201 may be chosen as suitable and safe for storing liquids at temperatures that are significantly above or below typical environment temperatures (e.g. for storing hot or cold beverages), whereas outer vessel 101 may be selected to be only suitable and safe for storing liquids at temperatures that are around normal environment temperatures (for example in the range of 1-20 degrees Celsius), or just for storing liquids that are at or below normal environment temperatures.

With reference to FIGS. 2A-2D, outer vessel 101 will provide a relatively strong, break-resistant protective shell for container 100. Outer vessel 101 can be made from a wide variety of materials suitable to fulfil the functions as described herein.

Suitable outer vessel materials may be selected based on one or more, or a combination of other additional physical and chemical properties including, for example, odour resistance, heat and chemical resistance including hydrolytic stability, transparency/translucency and visual clarity, touch feel (flexibility), weight, durability, costs, availability and ease of processing and handling. Other factors may include potential hazard or toxicity to the users or the environment both during use and when disposed.

Suitable outer vessel materials may include polymers including copolymers, such as polyolefins and polyesters. For example, the outer vessel may contain one or more of copolyesters, polyethylenes including high-density polyethylene (HDPE) and low-density polyethylene (LDPE) or polyethylene terephthalates (PET), polypropylenes (PP), polycarbonates (PC), polyacrylates such as poly(methyl methacrylate)s (PMMA), polystyrenes (PS), polyvinyl chloride (PVC), Polybutylene Terephthalate (PBT), and derivatives or combination thereof.

A suitable copolyester material may contain terephthalic acid (TA), naphthalenedicarboxylic acid and ethylene glycol, and a catalyst metal, as described in U.S. Pat. No. 5,851,612 the entire contents of which is hereby incorporated herein by reference. Co-polyesters may be formed from monomers such as dimethyl terephthalate (DMT), tetramethyl cyclobutanediol, and cyclohexanedimethanol. For example see the teachings of U.S. Pat. No. 6,284,866 the entire contents of which is hereby incorporated herein by reference.

Particularly useful co-polyesters are those disclosed in U.S. Pat. No. 7,026,027 the entire contents of which is hereby incorporated herein by reference. Co-polyesters disclosed in this patent may be sold under the trade mark TRITAN™ by Eastman. Accordingly, a suitable copolyester may be an amorphous copolyester having an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3. The copolyester includes a diacid component comprising about 90 to 100 mole percent terephthalic acid residues and 0 to about 10 mole percent isophthalic acid residues and a diol component comprising about 10 to about 70 mole percent 1,4-cyclohexanedimethanol residues and about 90 to about 30 mole percent neopentyl glycol residues. The amorphous copolyesters comprises 100 mole percent diacid component and 100 mole percent diol component. The diacid component may consist essentially of about 90 to 100 mole percent terephthalic acid residues and 0 to about 10 mole percent isophthalic acid residues. The diol component may consist essentially of about 10 to about 70 mole percent 1,4-cyclohexanedimethanol residues and about 90 to about 30 mole percent neopentyl glycol residues. In some embodiments, the diacid component may consist essentially of at least 95 mole percent terephthalic acid residues, such as 100 mole percent terephthalic acid residues. The diol component may consist essentially of about 30 to about 70 mole percent 1,4-cyclohexanedimethanol residues and about 70 to about 30 mole percent neopentyl glycol residues, such as about 35 to about 60 mole percent 1,4-cyclohexanedimethanol residues and about 40 to about 65 mole percent neopentyl glycol residues. The amorphous copolyester may have an inherent viscosity (IV) of about 0.6 to about 1.1 dL/g and may include a diacid component consisting essentially of terephthalic acid residues; and a diol component consisting essentially of about 35 to about 60 mole percent 1,4-cyclohexanedimethanol residues and about 40 to about 65 mole percent neopentyl glycol residues.

Outer vessel 101 may also be made from plastics including made of the polymer materials discussed above.

In some embodiments, it is necessary that the outer vessel 101 be safe to hold a liquid from a human/animal health perspective. For example, outer vessel 101 may be made of one or more various relatively strong and rigid plastics, metals (such as for example aluminium, stainless steel and other metal alloys), composite plastic materials and other composites such as acrylic or any other break-resistant material that is suitable to hold a beverage.

However, a most particularly advantageous material that has been identified is Eastman's TRITAN™—as referenced above which is a clear copolyester that has specific advantageous features such being safe for storage and use, and which is also resistant to degradation by various chemicals such as for example detergents, acidic drink chemicals. TRITAN is considered a safe material for storing most if not all beverages that are to be consumed by people. Being a transparent material, TRITAN has advantages when used in container 100 such as for example, it is readily visible whether an inner vessel 201 and tea strainer 500 are located within the outer vessel 101. Additionally, if inner vessel 201 is also made from a transparent material such as a clear glass, any liquid held in the inner vessel 201 is visible from outside the container. TRITAN material is relatively very strong compared to other similar materials, but provides a slight degree of flexibility that assists in absorbing impact forces and thus providing some level of protection of the inner vessel.

Figure 2D:
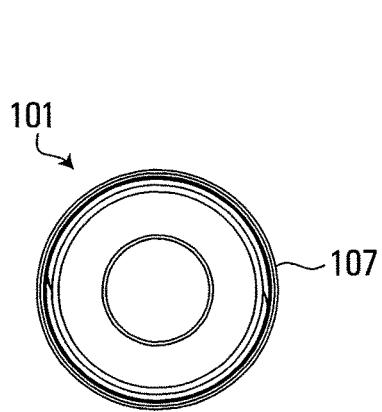
FIG. 2D is a top plan view of the part of FIG. 2A.
Figure 2A:
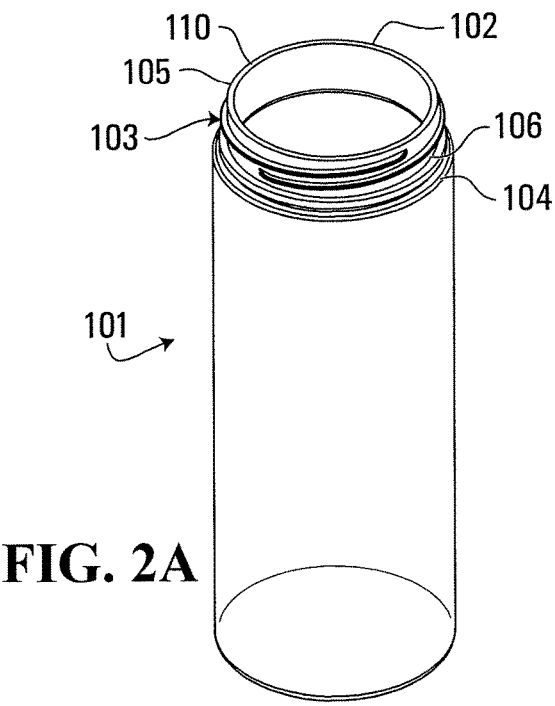
FIG. 2A is a perspective view of a part of the container of FIG. 1A.
Figure 2B:
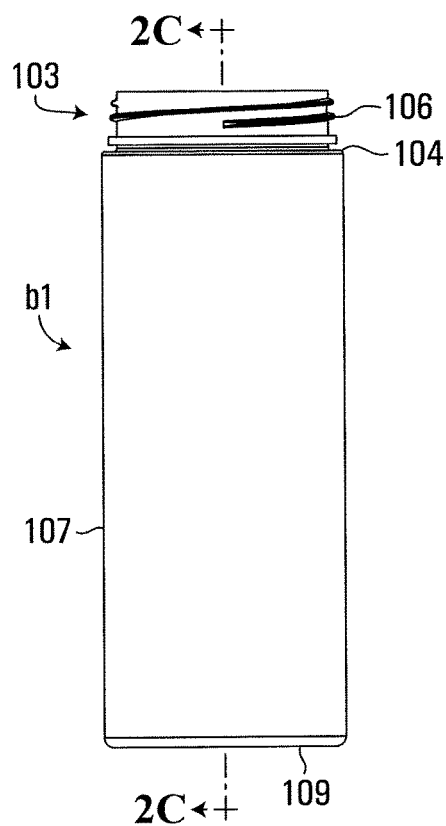
FIG. 2B is a front view of the part of FIG. 2A.
Figure 2C:
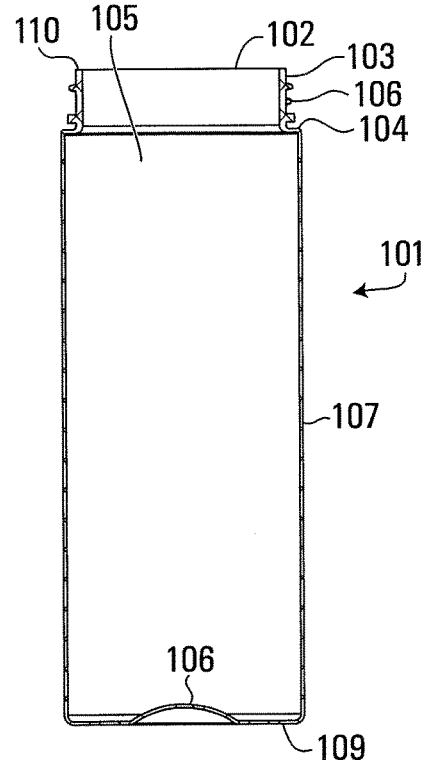
FIG. 2C is a elevation cross sectional view at section 2C-2C in FIG. 2B.
Figure 3A:
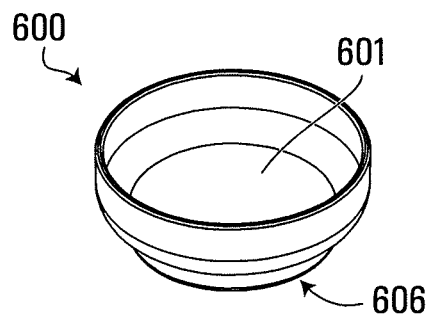
FIG. 3A is a perspective view of another part of the container of FIG. 1A.
Figure 3B:
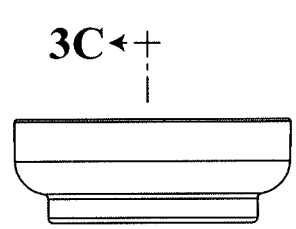
FIG. 3B is a front view of the part of FIG. 3A.
Figure 3C:
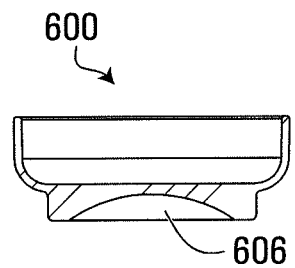
FIG. 3C is a elevation cross sectional view at section 3C-3C in FIG. 3B.
Figure 3D:
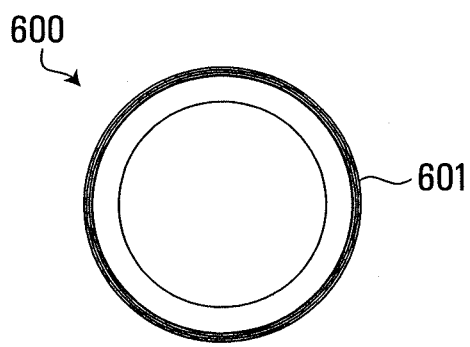
FIG. 3D is a top plan view of the part of FIG. 3A.
Figure 3E:
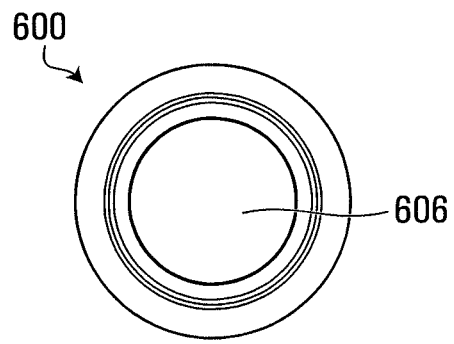
FIG. 3E is a bottom plan view of the part of FIG. 3A.
Figure 4A:
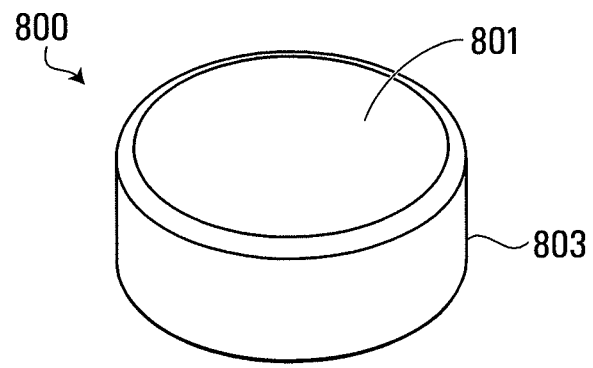
FIG. 4A is a perspective view of a part of the container of FIG. 1A.
Figure 4B:
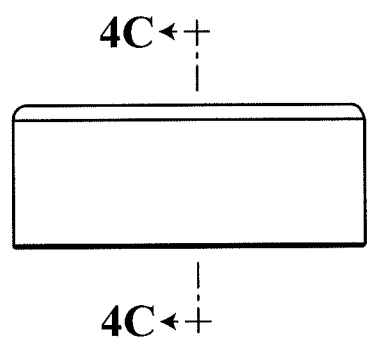
FIG. 4B is a front view of the part of FIG. 4A.
Figure 4C:
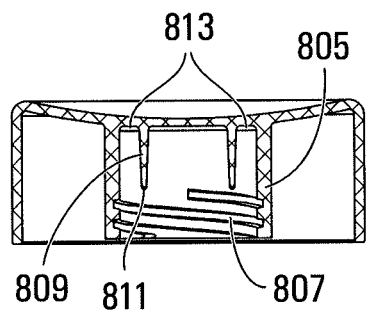
FIG. 4C is a elevation cross sectional view at section 4C-4C in FIG. 4B.
Figure 4D:
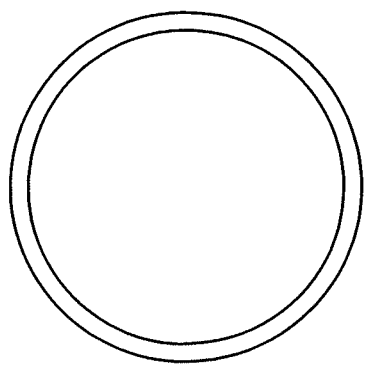
FIG. 4D is a top plan view of the part of FIG. 4A.
Figure 4E:
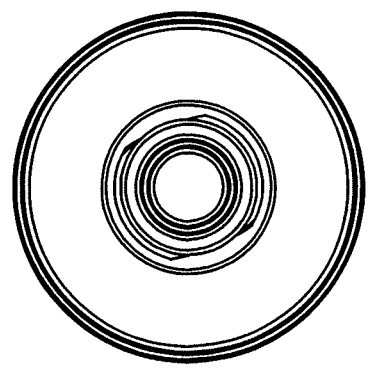
FIG. 4E is a bottom plan view of the part of FIG. 4A.
Figure 5A:
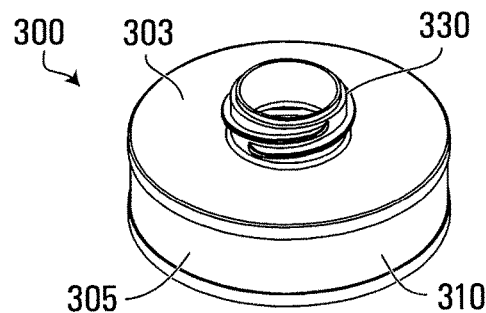
FIG. 5A is a perspective view of a part of the container of FIG. 1A.
Figure 5B:
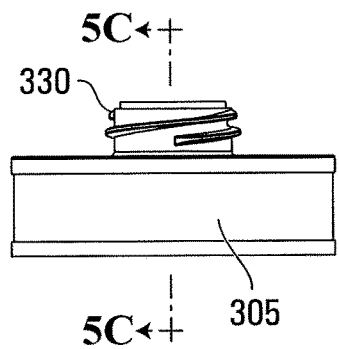
FIG. 5B is a front view of the part of FIG. 5A.
Figure 5C:
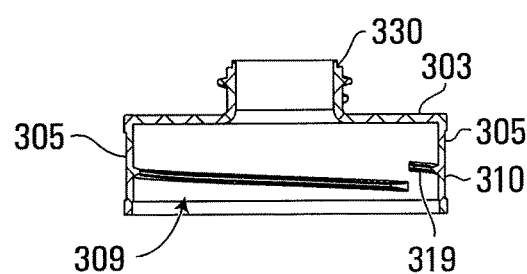
FIG. 5C is a elevation cross sectional view at section 5C-5C in FIG. 5B.
Figure 5D:
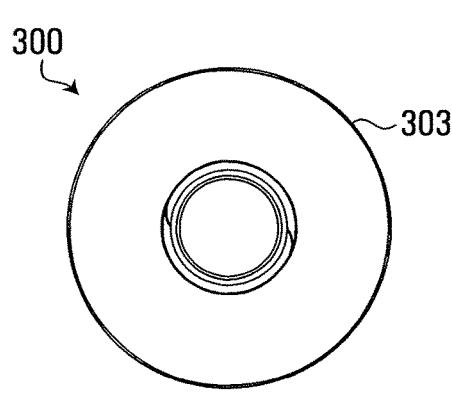
FIG. 5D is a top plan view of the part of FIG. 5A.
Figure 5E:
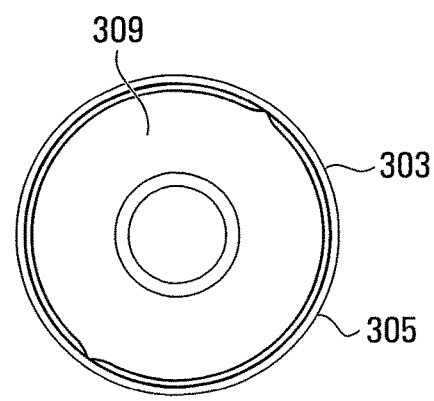
FIG. 5E is a bottom plan view of the part of FIG. 5A.
Figure 6A:
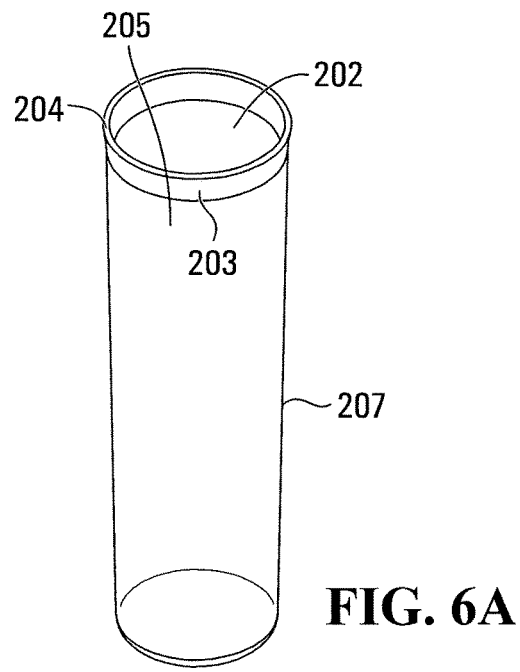
FIG. 6A is a perspective view of a part of the container of FIG. 1A.
Figure 6D:
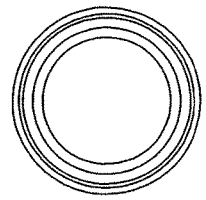
FIG. 6D is a top plan view of the part of FIG. 6A.
Figure 6E:
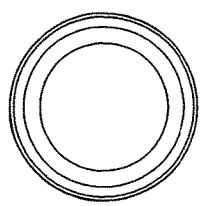
FIG. 6E is a bottom plan view of the part of FIG. 6A.
Figure 6B:
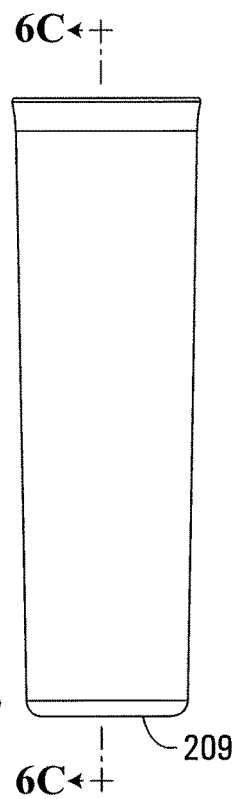
FIG. 6B is a front view of the part of FIG. 6A.
Figure 6C:
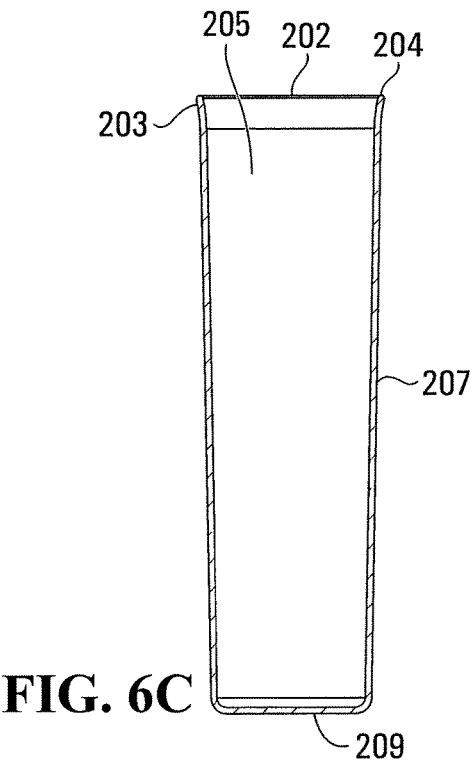
FIG. 6C is a elevation cross sectional view at section 6C-6C in FIG. 6B.
Figure 7A:
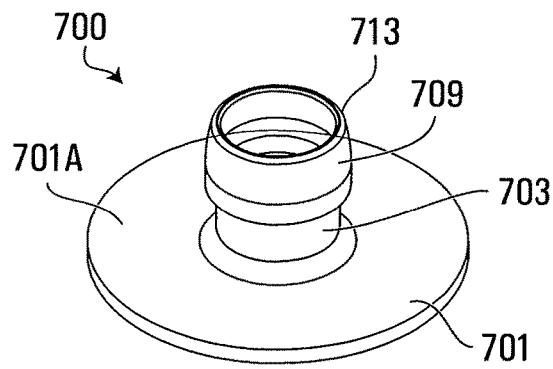
FIG. 7A is a perspective view of a part of the container of FIG. 1A.
Figure 7D:
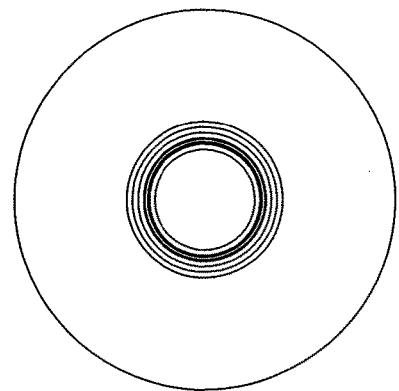
FIG. 7D is a top plan view of the part of FIG. 7A.
Figure 7B:
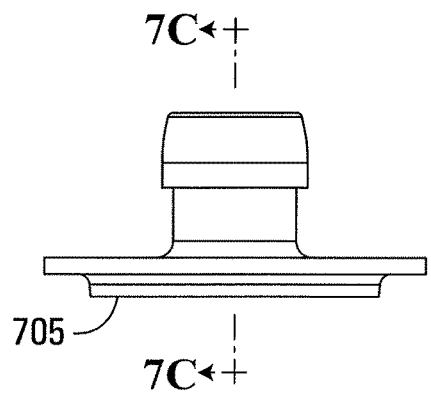
FIG. 7B is a front view of the part of FIG. 7A.
Figure 7C:
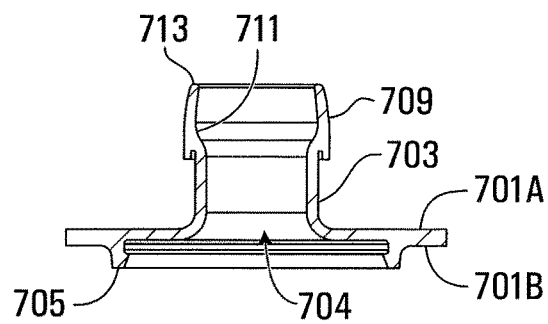
FIG. 7C is a elevation cross sectional view at section 7C-7C in FIG. 7B.

As can be seen in detail in FIGS. 2A-2D, the outer vessel 101 may have a shape of a generally tubular cylinder, and in particular may be a generally right cylinder, with an inner cavity 105 defined by the inner surface of the curved circular side wall 107. The outer vessel 101 may also have a closed bottom wall 109 and a top opening 102. As can be seen in FIG. 2C, bottom wall 109 may have a central upward dome portion 106. Dome portion 106 can be configured to mate with a dome-shaped indentation 606 in a bottom surface of base pad 600 of inner vessel 201 (see FIG. 3C). Thus, the co-operating dome portions of the inner vessel 201 and base pad 606, can, when inner vessel 201 is connected to base pad 600, form a lower stabilization device to help to locate inner vessel 201 in a relatively central location with its outer surface separated from the inner side wall surface of outer vessel 101.

The top edge of 104 of side wall 107 of outer vessel 101 leads to an integrally formed and slightly narrowed neck portion 103 which carries outwardly oriented threads 106. Neck portion 103 terminates at an upper edge 110. Thus, the top neck portion 103 of the generally cylindrical outer vessel 101, proximate opening 102, can be configured to be releasably attachable to the lid 300, for example using spiral thread interconnection between threads on an inside surface of the lid 300 and threads 106 on the neck portion 103.

With reference to FIGS. 6A-6E, inner vessel 201 may be shaped as a slightly conical, generally cylinder tube with an inner cavity 205. Inner vessel 201 may have a slightly tapered side wall 207 which provides slightly tapered inner and outside side surfaces. In other embodiments, generally side wall 207 may not be tapered either on the inner or outer surfaces. Inner vessel 201 may also have a closed bottom wall 209, from which side wall 207 may extend to a generally circular upper opening 202. The upper-most portion 203 of side wall 207 leading to opening 202 may be further flared or tapered outwards as will be evident for example in FIG. 6c. Inner vessel 201 may be sized and shaped to be able to be received into the inner cavity 105 of outer vessel 101. Preferably a space separate the outer surface of inner vessel 201 from the inner surface of outer vessel 101, except in the region where lid 300 engages the top of inner vessel 201 and connects to the outer threads 106 on neck portion 103 of outer vessel 101 (see for example FIG. 10B).

Inner vessel 201 may be made of a material that is generally not as resistant to breakage as the outer vessel 101 when subjected to impact forces as the material from which the outer vessel is made, yet be specifically selected to be inert and be especially useful in holding liquids for human consumption, particularly hot or cold liquids. Inner vessel 201 may be made of glasses such as borcilite glass/borsilicate glass, ceramics such as pottery including earthenware, stoneware and porcelain; and coloured glass. Suitable ceramics may include oxides, nonoxides and composite materials.

In some other embodiments, inner vessel 201 may be made from plastics (polymers) as discussed above in relation to the choice of materials for outer vessel 201. However, the material from which inner vessel 201 is made may be chosen for other characteristics, such as odour resistance, heat and chemical resistance including hydrolytic stability. In some embodiments, the chemical and bio-compatibility may be given more consideration, and the impact resistance may be given less consideration in some embodiments, as compared to the selection of the outer vessel material.

The choice of material for inner vessel 201 may provide for a vessel that is food safe and taste and/or odour inert.

With concerns being raised about the use of at least some plastics in storing beverages for human consumption, particularly hot beverages, or when containers are subjected to relatively cold temperatures, the use of these types of these other materials including glass alleviates some of those concerns.

The outer dimension and shape of inner vessel 201 may be selected so that all or substantially all of inner vessel 201 can be received through top opening 102 of outer vessel 101 and thus be located entirely or substantially entirely within, inner cavity 105. In some embodiments, a portion of the outer cylindrical wall 207 near opening 202 of the inner vessel 201 may be of such dimensions and shape that it does not fit through the opening of the outer vessel 101. As indicated above, the upper-most portion 203 of side wall 207 leading to opening 202 may be further flared or tapered outwards so it may engage the top edge 105 of neck portion 103 of the outer vessel 101 (see for example in FIG. 10B or 11B). The engagement of the outward facing surface 203 near top edge 204 of inner vessel 201 with the top edge 110 of outer vessel 101 and thus the top edge 204 of inner vessel 201 may substantially rest on top of the top edge 110 of outer vessel 101. This co-operation of inner vessel and outer vessel may provide for lateral stabilization and securement of inner vessel 201 relative to outer vessel 101.

With reference to FIGS. 3A-3E, a base pad 600 may be provided and may be formed from a material that provides sufficient support for inner vessel 201 and some level of shock absorption. Base pad 600 may be made from any energy or shock-absorbing material which when compressed between outer vessel 101 and inner vessel 201 it is readily and reversibly deformed to absorb impact force but still stabilizes inner vessel 201 relative to outer vessel 101. In some embodiments, base pad 600 may be made of an elastomeric material. An elastomer can, after being deformed, return to approximately original shape and dimensions in a relatively short time Example elastomeric materials include suitable thermoplastic polymers, thermoplastic rubbers (TPR), thermoset rubbers, or co-polymers or mixtures thereof. In some embodiments, suitable thermoplastic polymers may be selected from elastomer (TPE) styrenics, polyolefins (TPO), low density polyethylenes (LDPE), high-density polyethylenes (HDPE), linear low-density polyethylenes (LLDPE), ultra low-density polyethylenes (ULDPE), polyurethanes (TPU) polyethers, polyesters, etheresterelastomers (TEEEs) copolyesters, polyamides (PEBA), melt processible rubbers (MPR), vulcanizates (TPV), and mixtures or co-polymers thereof. In some embodiments, suitable elastomers and rubbers may also be selected from butadiene rubbers (BR), butyl rubbers (IIR or PIB), chlorosulfonated polyethylenes (CSM), epichlorohydrin rubbers (ECH or ECO); ethylene propylene diene monomer (EPDM), ethylene propylene rubber (EPR), floroelastomers (FKM), nitrile rubbers or nitrile butadiene rubbers (NBR), perfluoroelastomers (FFKM), polyacrylate rubbers, (ASM), polycholorprene (CR), polyisoprene (IR), polysulfide rubbers (PSR), polysiloxanes or silicone rubbers (SiR), styrene butadiene rubbers (SBR), and mixtures or co-polymers thereof. To modify the properties of the elastomer or for processing purposes, additives such as vulcanizing materials, antioxidants, plasticizers, fillers, and colorants may be added. In one embodiment the base pad 600 may be made from a silicone rubber. It is also possible to use other resilient materials that can support and stabilize inner vessel while providing energy impact absorption.

Pad 600 may be configured with an upward facing pocket 601 which can be received onto the bottom of inner vessel 201. As the base pad material may be somewhat elastic, if it is sized appropriately, base pad pocket 601 may be resiliently displaced when fitted onto the bottom of inner vessel 201 thus being secured thereon. Base pad 600 can provide support and shock absorption when installed onto the bottom surface of inner vessel 201 between the lower surface of inner vessel's bottom wall 209 and the upper surface of the bottom wall 109 of outer vessel 101. Thus when an impact force is transmitted to the outer vessel 101, any shock that might be transmitted from the bottom wall 109 of outer vessel 101 to the bottom wall 209 of the inner vessel 201 can be significantly reduced. As will be explained hereinafter, the force absorption effect for inner vessel 201 is enhanced by also providing cushioning at the top end of the inner vessel 201 and/or outer vessel 101. In the embodiment illustrated, the enhanced absorption may be provided by use of a spout seal 700 that is located within lid 300. Spout seal 700 may be made from any food-safe material which, when compressed between lid 300 and the top edge of outer vessel 101 or inner vessel 201, is readily and reversibly deformed to provide a fluid-tight seal between such components. The material used for seal spout 700 may have similar properties as, and selected from, the materials discussed above as being suitable for the base pad 600. A material is food-safe if it complies with food safety requirements imposed for example by governmental, trade, and corporate agencies, or if it meets a generally accepted food industry standard. In selected embodiments, seal spout 700 may be made from a silicone rubber.

Container 100 may also include lid 300 (with seal spout 700 installed) and a cap 800. These components can co-operate to releasably contain liquid within the inner cavity 205 of inner vessel 201 (when the inner vessel is located inside the outer vessel) or within cavity 105 of outer vessel 101 if the container 100 is being configured with no inner vessel 201.

Lid 300 may be comprised of a generally cylindrical body portion 310 and an integrally connected cylindrical spout portion 330. Thus lid body 310 may have a disc plate portion 303 from which extends a generally arcuate, circumferentially extending side wall 305 defining an inner cavity portion 309 that leads to an opening in disc 303 an into an inner passage through spout 330.

Lid 300 can be made of plastics (particularly engineered plastics), metals, or a composite material so long as it is compatible for providing a threaded engagement to threads 106 of outer vessel 101. By way of example only, lid 300 could be made from a relatively hard plastic such as polypropylene, acrylonitrile butadiene styrene (ABS), high-density polyethylene (HDPE) and other similar plastics. Within the inner cavity 309 of lid body 310, on the inner surface of side wall 305, can be provided internal threading 319 that are configured to co-operate with the external threading 106 of outer vessel 101. Thus lid 300 may be adapted to reversibly attach to the outer vessel 101, using for example spiral threading.

To assist with providing a seal between either the cavity 105 of inner vessel 201 and/or the cavity 205 of outer vessel 101, seal spout 700 can be provided and if made from an elastic material can be press fit into engagement with lid 300. Seal spout 700 may be formed with a sealing disc 701 having an upper surface 701a and lower surface 701b. Surface 701a can be positioned within cavity 309 or lid 300 in positive engagement with a downward facing surface of lid body portion 310 of lid 300. Spout neck 703 of spout seal 700 can be received within and through lid spout 330 of lid 300. Spout portion 709 may protrude above lid spout 330. In some embodiments, the part of the seal spout 700 that extends beyond the spout 330 of lid 300 has an outer diameter greater than the inner diameter of the spout 330, and thereby inhibits the inner seal spout 700 from sliding out of the lid 300. This arrangement may assist in attaching the sealing spout 700 to the lid 310.

An aperture 704 extending through sealing disc 701, spout neck 703 and spout portion 709, thus provides a communication channel for liquid through lid 300 such that liquid moving from either cavity 105 in inner vessel 201 or cavity 205 in outer vessel 101 never contacts any surface of lid 300 when passing through lid 300 when a person is accessing the liquid held in container 100.

Therefore, co-operating together, lid 300 and spout seal 700 can be configured to form a liquid-tight seal with the outer vessel in the absence of the inner vessel. If the inner vessel is not inside outer vessel, the lid 300 will, when the lid is closed, have the lower sealing disc 701B portion of the sealing member 700 compressed between the body of the lid 310 and the upper edge 110 of the outer vessel 101, to form a liquid-tight seal between the sealing member 700 and the outer vessel (see FIG. 12B).

With particular reference to FIGS. 4A-4E, cap 800 may be comprised of a top portion 801 from which extends a generally arcuate, circumferentially extending side wall 803 forming a cylindrical body and defining a cavity. The top portion 801 may be concave, extending into the cavity formed by the top portion 801 and the side wall 803. From the top portion 801 extends a second generally arcuate, inner side wall 805 forming a cylindrical inner cavity. The inner surface of the inner side wall 805 may be adapted with spiral threading to reversibly engage with the threading on the outer surface of the spout 330.

From the top portion 801 extends a third generally arcuate, inner side wall 809 forming a cylindrical inner cavity. The cylindrical cavity formed by side wall 809 may be concentric with but smaller in diameter than the cylindrical cavity formed by side wall 805. Side wall 809 may be shorter than side walls 803 and 805. As it extends away from the top portion 801, side wall 809 may gradually decrease in cross-sectional width and taper to a narrow end 811. The distance between side wall 805 and side wall 809 defines a ring-shaped region 813 on the inner surface of the top portion 801 (see FIG. 4C).

When the cap 800 is closed over spout 330, the narrow end 811 of inner side wall 809 comes into contact with the inner surface 711 of the spout portion 709. This contact contributes to forming a liquid-tight seal between the cap 800 and the spout 330. In addition, when the cap 800 is closed over spout 330, the top portion 713 of the spout portion 709 comes into contact with the ring-shaped region 813. This contact also contributes to forming a liquid-tight seal between the cap 800 and the spout 330 (see FIG. 12B).

Cap 800 can be made of plastics (particularly engineered plastics), metals, or a composite material so long as it is compatible for providing a threaded engagement to threads on the outer surface of the spout 330. By way of example only, cap 800 could be made from a relatively hard plastic such as polypropylene, acrylonitrile butadiene styrene (ABS), high-density polyethylene (HDPE) and other similar plastics.

Thus spout 330 may be enclosed by cap 800, which can reversibly form a liquid-tight seal with the spout 330 of the lid 300. Cap 800 can be made from a material that is the same or different to lid 300. In one embodiment, both lid 300 and cap 800 may be made from polypropylene.

In a mode of operation, the lid 300 with sealing spout 700 in place can be configured to releasably secure the inner vessel 201 within the outer vessel 101 and to form a liquid-tight seal between the sealing spout 700 and the top edge 204 of the cylindrical wall of inner vessel 201. As shown in FIGS. 10B and 11B, the opening 202 of the inner vessel 201 may be of such a shape and dimension that it will not fit through the mouth of the outer vessel 102. In this embodiment, when the inner vessel 201 is placed inside the outer vessel 101 and the lid 300 is secured on the top of outer vessel 101, the sealing member 700 is compressed between the body of the lid 300 and the top edge 204 of the outer wall at opening 202 of the inner vessel 201. This can apply compression to, and thereby secure, the inner vessel 201 in place as it is held between the seal spout 700 and base pad 600. Also, this configuration can form a liquid-tight seal between the sealing spout 700 and the edge 204 near the top opening of the inner vessel 201 such that liquid held within inner cavity 205 can not pass except through the top opening in the seal spout 700. Also, the engagement of the outward facing surface 203 proximate top edge 204 of inner vessel 201 with the top edge 110 of outer vessel 101 may provide for lateral stabilization and securement of inner vessel 201 relative to outer vessel 101. The result is that the inner vessel 201 can be held between upper and lower impact absorption devices (i.e. base pad 600 and the combination of seal spout 700 and lid 300) with both the bottom and top of inner vessel 201 being also supported against lateral movement relative to the inner surface of side wall 107 of outer vessel 101. Additionally, a substantial air seal may be provided between the top of the inner vessel and the top of the outer vessel to thereby trap the air located in the space between the outside surface of side wall 207 of inner vessel 201 and the inside surface of side wall 107 of outer vessel 101. This area of substantially sealed air can act to provide insulation either to slow down the cooling of a hot liquid held in inner cavity 205 of inner vessel 201 or to slow down the increase in temperature of a cold liquid, relative to the outside environment's temperature. In effect, the double wall structure can in this embodiment and in other embodiments described herein, as an insulation layer.

In a variation (not shown), the inner vessel 201 and base pad may be significantly taller than the outer vessel 101 is deep. Therefore, when resting inside the outer vessel 101, the inner vessel 201 extends through and beyond the mouth of the outer vessel. When the inner vessel is placed inside the outer vessel and the lid is closed, the sealing disc 701 is compressed between the body of the lid 310 and the mouth of the inner vessel 201, secures the inner vessel in place, and forms a liquid-tight seal with the inner vessel. However, to increase the stability of the inner vessel relative to the outer vessel, the cap 800 may need to provide within its cavity a configuration which provides some lateral support for the top of the inner vessel.

In another variation (also not shown), the inner vessel and base pad may be as tall as the outer vessel is deep. Therefore, when resting inside the outer vessel, the inner vessel extends just to the mouth of the outer vessel. When the inner vessel is placed inside the outer vessel and the lid is closed, the sealing disc 701 is compressed between the body of the lid 310 and both the mouth of the inner vessel 201 and the mouth of the outer vessel 102, securing the inner vessel in place, and forming a liquid-tight seal with both the inner vessel and the outer vessel.

In another variation (also not shown), the container 100 may be assembled without the base pad 600. In this embodiment the engagement of the outward facing surface 203 proximate top edge 204 of inner vessel 201 with the top edge 110 of outer vessel 101 can prevent the inner vessel from falling into the outer vessel 201. This engagement suspends the inner vessel within the outer vessel so that the inner vessel does not come into contact with the outer vessel other than at the points of aforementioned engagement. When the inner vessel 201 is placed inside the outer vessel 101 and the lid 300 is secured on the top of outer vessel 101, the sealing member 700 is compressed between the body of the lid 300 and the top edge 204 of the outer wall at opening 202 of the inner vessel 201. This can secure the inner vessel 201 in place as it is held between the seal spout 700 and the top edge 110 of the outer vessel 101. Also, this configuration can form a liquid-tight seal between the sealing spout 700 and the edge 204 near the top opening of the inner vessel 201 such that liquid held within inner cavity 205 can not pass except through the top opening in the seal spout 700.

Figure 8A:
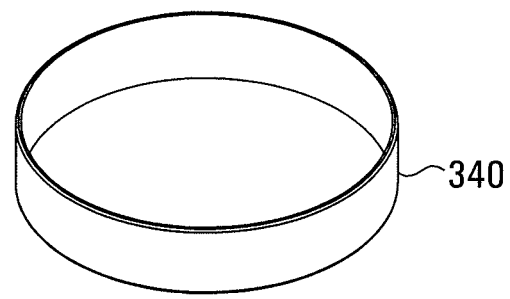
FIG. 8A is a perspective view of a part of the container of FIG. 1A.
Figure 8B:
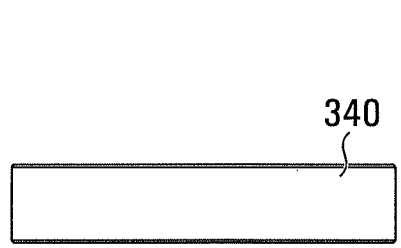
FIG. 8B is a front view of the part of FIG. 8A.
Figure 8C:
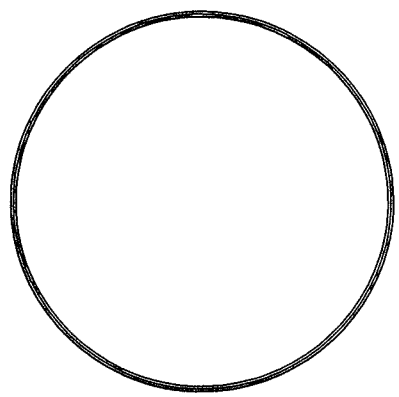
FIG. 8C is a top plan view of the part of FIG. 5A.
Figure 9A:
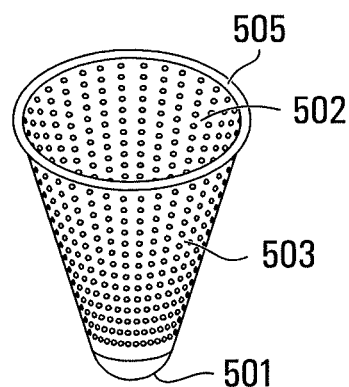
FIG. 9A is a perspective view of a part of the container of FIG. 1A.
Figure 9B:
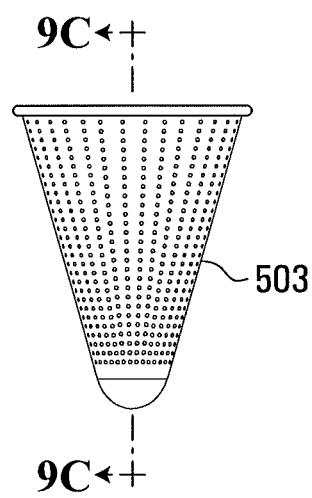
FIG. 9B is a front view of the part of FIG. 9A.
Figure 9C:
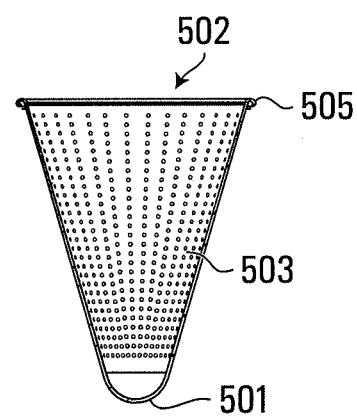
FIG. 9C is a elevation cross sectional view at section 9C-9C in FIG. 9B.
Figure 9D:
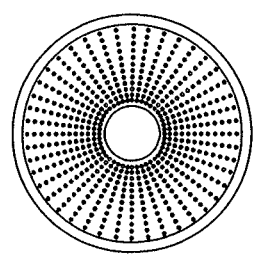
FIG. 9D is a top plan view of the part of FIG. 9A.
Figure 9E:
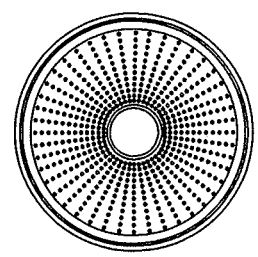
FIG. 9E is a bottom plan view of the part of FIG. 9A.

The lid 300 may also have a grip band 340 that may be positioned around it. The grip band may be a separate component (see FIGS. 8A-8C) or be integrally formed as part of lid 300. Grip band 340 may be a band that provides a relatively high friction outer surface that runs along the circumferential area of side wall 305 of the lid 300. The increased friction can be added using any method known in the art including creating a band of rough, threaded, or textured finish running along the circumference of the lid, or by adding a band of a second tacky material such as rubber.

The cap 800 can reversibly attach to the lid through any means known in the art, including spiral threading on the outer surface of the spout 330 of lid 300. The liquid-tight seal with the spout 330 is formed using any of the methods known in the art. In one example where the spout portion 709 extends through and beyond the spout 330, the spout portion is compressed between the cap 800 and the spout 330 of lid 300 and forms a liquid-tight seal between the cap and the spout.

The invention may include a strainer 500, which can be used, for example, to keep steeping tea leaves separate from the contents of the inner vessel 201 and the outer vessel 101. The strainer 500 can be of any general shape configuration that is suitable to fulfil the functions identified herein. Strainer 500 can also be made of any material known in art to be suitable for coming into contact with hot beverages, including metals, plastics, composite materials, or cloth. The strainer may be free floating, attached to a retrieval device such as a handle, wire, or thread, or attached using any method known in the art to a part of the beverage container such as the outer vessel 101, the inner vessel 201, the lid 300, the body of the lid 310, or the seal spout 700.

In one embodiment, a generally conically shaped strainer 500 is comprised of a closed bottom portion 501, a perforated body portion 503 and an upper rim 505 surrounding an opening 502. The opening 502 may be reinforced by rim 505 that may be a piece of steel wire or the like and which can be formed integrally with the body of the tea strainer or as a separate piece. The spout seal 700 that may be held in lid 300 may be adapted to include a strainer attachment annular ring 705, such that the rim 503 can releasably inserted into the strainer attachment ring 705. In addition to holding the strainer in place, the spout seal 700 may also encloses the opening 502 of the strainer 502 and prevents the contents of the strainer from entering the outer vessel 101 or the inner vessel 201.

Figure 10A:
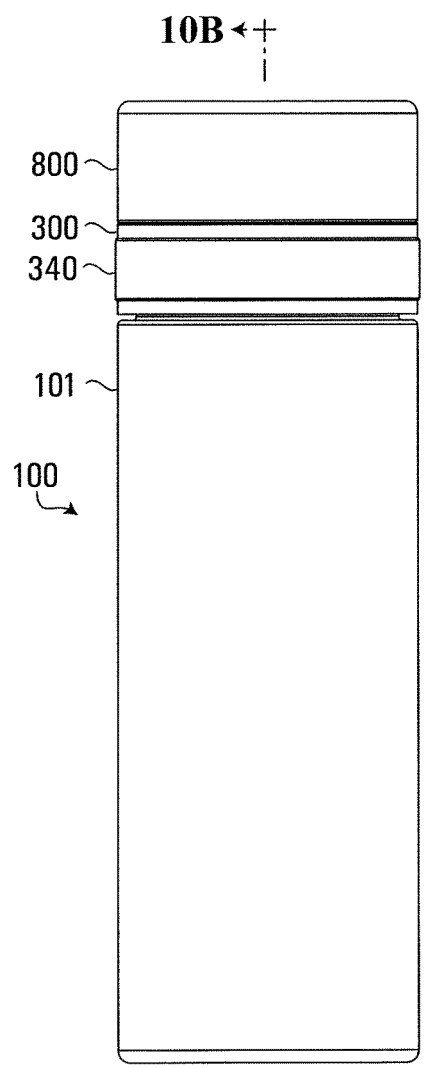
FIG. 10A is a front elevation view of the container of FIG. 1A configured in a first mode of operation.
Figure 10B:
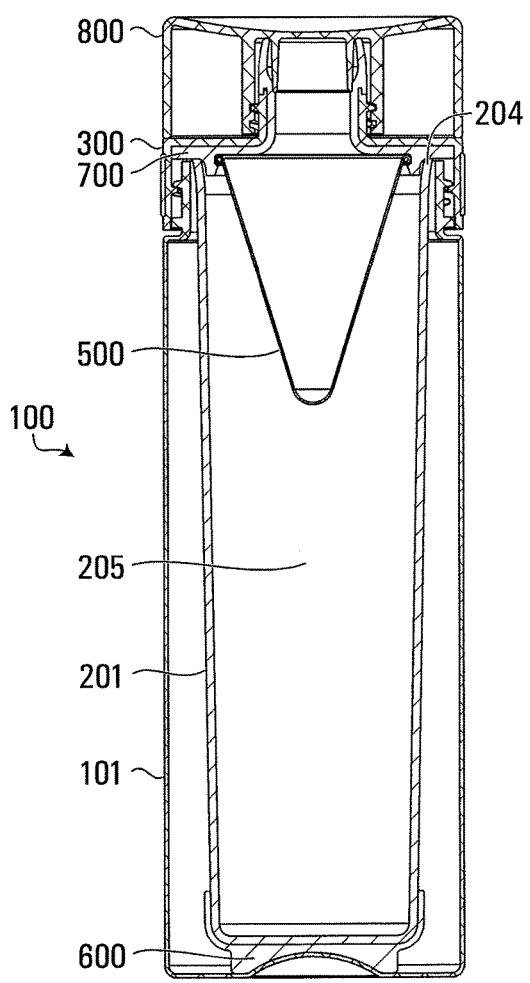
FIG. 10B is a elevation cross sectional view at section 10B-10B in FIG. 10A.

In use container 100 may be used in at least in any one of three modes of operation illustrated in FIGS. 10A, 10B; 11A, 11B and 12A, 12C.

In a first mode of operation illustrated in FIGS. 10A and 10B, container 100 is shown with all components being used including inner vessel 201 being held securely within outer vessel 101, and with the strainer 500 being held by seal spout 700. When used in this a mode, a person can have placed tea leaves in the strainer, then attach the strainer to the seal spout and lid combination. With cap 800 removed, hot water can be poured through spout components 330/709/703 passing though lid 300 into inner vessel 201. Then cap 800 can be secured to lid 300 to hold the hot tea beverage within inner cavity 205 of inner vessel 201.

Figure 11A:
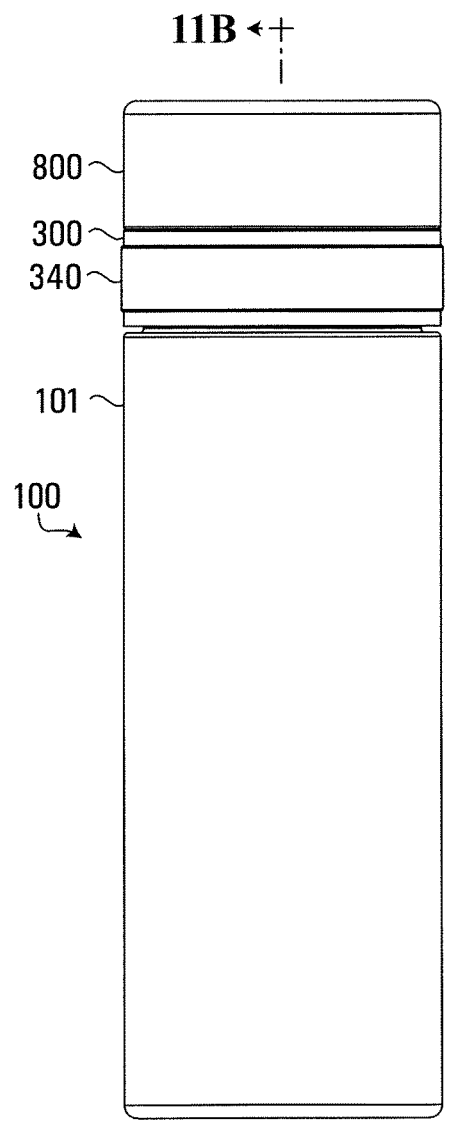
FIG. 11A is a front elevation view of the container of FIG. 1A configured in a second mode of operation.
Figure 11B:
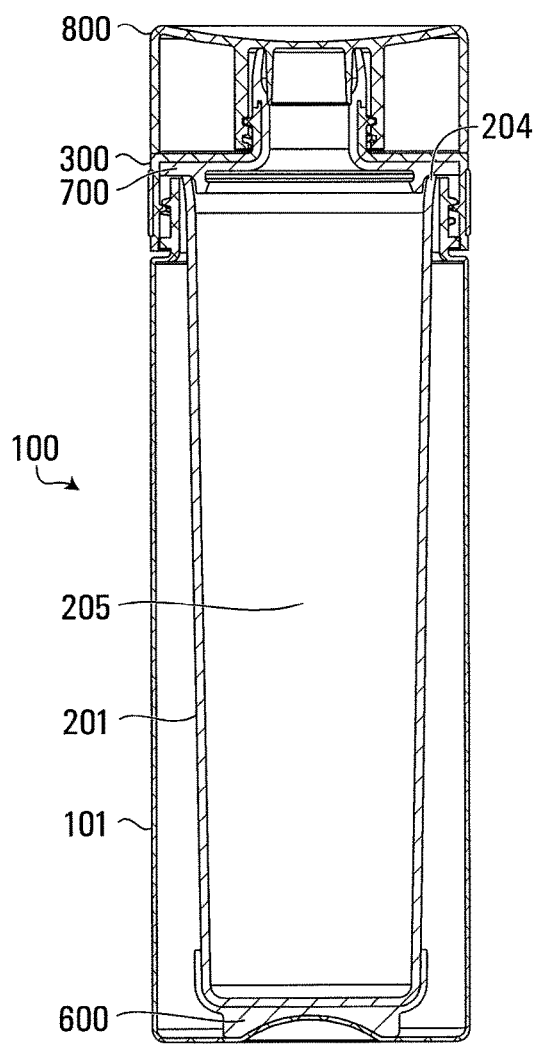
FIG. 11B is a elevation cross sectional view at section 11B-11B in FIG. 11A.

In a second mode of operation illustrated in FIGS. 11A and 11B, container 100 is shown with all components being used including inner vessel 201 being held securely within outer vessel 101, except the strainer 500. When used in this a mode, a person can fill inner vessel with a hot or cold beverage. This can be done either with the inner vessel 201 already inserted into outer vessel 101 or with the inner vessel removed during filling. Regardless, inner vessel 201 can be inserted into the outer vessel and hold the hot beverage in cavity 205. Cap 800 can be secured to lid 300 to hold the hot tea beverage within inner cavity 205 of inner vessel 201.

In a third mode of operation illustrated in FIGS. 12A and 12B, container 100 is shown with all components being used except inner vessel 201 and strainer 500. When used in this a mode, a person can fill the outer vessel 101 with a beverage preferably a beverage that is just warm, or at "room" or near to external environment temperature or also a "cold beverage". Cap 800 can be secured to lid 300 will hold the beverage within inner cavity 105 of outer vessel 101.

Each of components container 100 including outer vessel 101, inner vessel 201, lid 300, lid grip band 400, base pad 600, seal spout 700 and cap 800 can be formed using various types of know manufacturing processes. For example at least some or all of plastic parts could be formed using injection moulding technology known to those skilled in the art. The outer vessel 201 when made from TRITAN can be best made using blow moulding techniques known to those skilled in the art.

Tea strainer 500 if made from a metal could be specially fabricated using known metal working techniques such as die cut metal working and spot welding.

Although not specifically described in detail herein, suitable modifications may be made to the embodiments described by persons skilled in the art depending on the type of wash facility, and otherwise, being used for a particular application. Of course, the foregoing embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed element.

The invention claimed is:

1. A container comprising:
an outer vessel having an inner cavity, and an edge defining an opening of said inner cavity of said outer vessel;
an inner vessel having an inner cavity, and an edge defining an opening of said inner cavity of said inner vessel;
a bottom impact absorption pad configured to engage a bottom surface of said inner vessel;
said inner vessel and said outer vessel being configured for receiving all or substantially all of said inner vessel through said opening of said inner cavity of said outer vessel into said inner cavity of said outer vessel with said bottom impact absorption pad interposed between said inner vessel and said outer vessel such that in operation, said opening of said inner cavity of said inner vessel may be releasably positioned proximate said opening of said inner cavity of said outer vessel;
a lid assembly, comprising a top impact absorption seal, a lid configured to removably attach to said outer vessel and thereby urge said top impact absorption seal against said inner vessel to seal against said edge of said inner vessel and said edge of said outer vessel, and a strainer removably held in said lid, sized and configured to allow said strainer to extend into said inner vessel when attached to said lid.

2. A container as claimed in claim 1 wherein said inner vessel is made at least in part from a material that is safe for storage and use when holding a liquid beverage and said outer vessel is made from a material that is relatively impact resistant.

3. A container as claimed in claim 2 wherein said outer vessel is made at least in part from a material that is safe for storage and use when holding a liquid beverage.

4. A container as claimed in claim 2 wherein said outer vessel is made at least in part from a material selected from polyesters, polyethylenes, polypropylenes (PP), polycarbonates (PC), polyacrylates, polystyrenes (PS), polyvinyl chloride (PVC), polybutylene terephthalate (PBT), and derivatives or combinations thereof.

5. A container as claimed in claim 2 wherein the outer vessel is made from a material comprising a copolyester.

6. A container as claimed in claim 5 wherein said inner vessel is made at least in part from a material selected from glasses and ceramics.

7. A container as claimed in claim 5 wherein said inner vessel is made from glass.

8. A container as claimed in claim 1 wherein said inner vessel is made from glass.

9. A container as claimed in claim 1 wherein said bottom impact absorption pad is made from an elastic material.

10. A container as claimed in claim 1 wherein said top impact absorption seal is made from an elastic material.

11. A container as claimed in claim 9 wherein said top impact absorption seal is made from an elastic material.

12. A container as claimed in claim 10 wherein said inner vessel may be held in compression between said top impact absorption seal and said bottom impact absorption pad.

13. A container as claimed in claim 1 wherein said lid has a spout, said spout being in fluid communication with the inner cavity of said inner vessel, when said inner vessel is received within the inner cavity of said outer vessel and is contained therein by said lid assembly.

14. A container as claimed in claim 13 further comprising a cap configured to be releasably connected to said lid to selectively open and close said spout of said lid.

15. A container as claimed in claim 1 wherein said container is operable such that when said inner vessel is received within said inner cavity of said outer vessel and said opening of said inner cavity of said inner vessel is positioned proximate said opening of said inner cavity of said outer vessel, a top edge portion of said inner vessel abuts an upper portion of said outer vessel to provide lateral stabilization of said inner vessel relative to said outer vessel.

16. A container as claimed in claim 1 further comprising a lower stabilization device positioned proximate and interposed between a bottom portion of said inner vessel and a bottom portion of said outer vessel, and wherein said container is operable such that when said inner vessel is received within said inner cavity of said outer vessel and said opening of said inner cavity of said inner vessel is positioned proximate said opening of said inner cavity of said outer vessel, said lower stabilization device is operable to provide lateral stabilization of said inner vessel relative to said outer vessel.

17. A container as claimed in claim 1 wherein said inner vessel is made substantially from glass and said outer vessel is made substantially from a copolyester.

18. A container as claimed in claim 17 wherein said lid is made from polypropylene.

19. A container as claimed in claim 18 wherein said top impact absorption seal is made from silicone.

20. A container as claimed in claim 1 wherein said top impact absorption seal is secured to said lid and wherein said strainer is configured for releasable connection to said top impact absorption seal.

21. A container as claimed in claim 20 wherein said strainer is a tea strainer.

22. The container of claim 1, wherein said top impact absorption seal comprises a spout seal, having a drinking neck extending therefrom.

23. The container of claim 22, wherein said spout seal comprises an annular ring to mount said strainer in said lid assembly.

24. A container comprising:
an outer vessel having an inner cavity, said outer vessel having an edge defining an opening;
an inner vessel having an inner cavity, said inner vessel having an edge defining an opening;
said inner vessel and said outer vessel being configured for receiving all or substantially all of said inner vessel through said opening of said outer vessel into said inner cavity of said outer vessel such that in operation, said opening of said inner vessel may be releasably positioned proximate said opening of said outer vessel;
a lid removably attachable to said outer vessel for releasably enclosing said inner vessel within said outer vessel, said lid having an inner cavity, and for enclosing said inner cavity of said outer vessel when said inner vessel is not located within said outer vessel;
a sealing device disposed within said inner cavity of said lid to overlie said edge of said inner vessel and said edge of said outer vessel, said sealing device being configured for providing (a) a seal with said edge of said inner vessel when said inner vessel is located within said inner cavity of said outer vessel and (b) a seal with said edge of said outer vessel when said inner vessel is not located within said inner cavity of said outer vessel;
a strainer removably held and supported in said lid, sized and configured to allow said strainer to extend into said inner vessel when attached to said lid and when said inner vessel is located within said outer vessel, and to be removed from said container when held by said lid.

25. A method of using a container, said container comprising:
an outer vessel having an inner cavity, said outer vessel having an edge defining an opening;
an inner vessel having an inner cavity, said inner vessel having an edge defining an opening;
said inner vessel and said outer vessel being configured for receiving all or substantially all of said inner vessel through said opening of said outer vessel into said inner cavity of said outer vessel such that in operation, said opening of said inner vessel may be releasably positioned proximate said opening of said outer vessel;
a lid assembly comprising a lid for releasably enclosing said inner vessel within said outer vessel; a seal configured to overlie said edge of said outer vessel and said edge of said inner vessel to form a seal therewith and a strainer removeably attached to said lid to extend into said inner vessel;
wherein said method comprises:
removing said lid assembly from said outer vessel, wherein said removing comprises breaking a seal between said seal and said edge of said inner vessel;
removing said strainer from said lid assembly;
removing said inner vessel from said outer vessel through said opening of said outer vessel;
removably attaching said lid assembly to said outer vessel such that said seal forms a seal with said edge of said outer vessel.

26. A method as claimed in claim 25 wherein said container further comprises a bottom impact absorption pad interposed between an inner surface of a bottom wall of said outer vessel and an outer surface of a bottom wall of said inner vessel and wherein said method further comprises mounting said bottom impact absorption pad at said bottom wall of said inner vessel.

27. A method as claimed in claim 26 wherein said container further comprises a top impact absorption pad interposed between a top portion of said inner vessel and said lid assembly, when said inner vessel is substantially contained within said inner cavity of said outer vessel, and wherein said attaching said lid assembly also comprises securing said inner vessel between said top and bottom impact absorption pads.

28. A beverage container convertible between single and double walled configurations, comprising:
an outer flask defining an outer container cavity, and having an edge defining an opening extending into said outer container cavity, said outer cavity for holding a beverage in said single walled configuration;
an inner flask removably inserted into said outer container cavity in spaced relationship with said outer flask in said double walled configuration, said inner flask defining an inner container cavity and having an edge defining a opening into said inner container cavity, said inner container cavity for holding a beverage in said double walled configuration;
a lid assembly comprising a lid, at least one seal and a strainer removably held and supported in said lid, sized and configured to allow said strainer to extend into said inner flask when attached to said lid, said lid assembly removably attachable to said outer flask with said at least one seal configured to seal said lid with said edge of said inner flask in said double walled configuration, and with said strainer to extending into said inner vessel, said lid assembly further configured to seal said lid with said edge of said outer flask, with said strainer removed from said lid assembly, and said inner flask removed from said outer container cavity in said single walled configuration.

29. The beverage container of claim 28, wherein said lid comprises a drinking opening for dispensing a beverage from said inner container cavity in said double walled configuration and for dispensing a beverage from said outer container cavity in said single walled configuration.

30. The beverage container of claim 28, wherein said lid assembly comprises a single seal positioned above both said edge of said outer flask and said edge of said inner flask, wherein said lid is operable to seal with said edge of said outer flask or said edge of said inner flask by urging said seal against said edge of said outer flask or said edge of said inner flask.

* * * * *